United States Patent
Kirchhoff et al.

(10) Patent No.: US 11,150,539 B2
(45) Date of Patent: Oct. 19, 2021

(54) CAMERA MODULE FOR A VEHICLE AND OUTSIDE BODY PART WITH CAMERA MODULE

(71) Applicant: ZF Friedrichshafen AG, Friedrichshafen (DE)

(72) Inventors: Johannes Kirchhoff, Colnrade (DE); Alex Hessel, Lemförde (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 16/580,020

(22) Filed: Sep. 24, 2019

(65) Prior Publication Data

US 2020/0096838 A1    Mar. 26, 2020

(30) Foreign Application Priority Data

Sep. 26, 2018   (DE) .......................... 102018216459.2

(51) Int. Cl.
*G03B 17/08* (2021.01)
*B60R 11/04* (2006.01)
*G05D 1/02* (2020.01)

(52) U.S. Cl.
CPC .............. *G03B 17/08* (2013.01); *B60R 11/04* (2013.01); *G05D 1/0231* (2013.01)

(58) Field of Classification Search
None
See application file for complete search history.

(56) References Cited

U.S. PATENT DOCUMENTS

| | | | |
|---|---|---|---|
| 5,212,509 A * | 5/1993 | Kosako | G03B 17/08 348/81 |
| 6,507,700 B1 * | 1/2003 | Takekuma | H04N 5/22521 396/25 |
| 2002/0005997 A1 * | 1/2002 | Oba | H04N 5/2254 359/819 |
| 2003/0098908 A1 | 5/2003 | Misaiji et al. | |
| 2006/0202293 A1 * | 9/2006 | Bogdan | H01L 27/14618 257/432 |
| 2014/0060582 A1 * | 3/2014 | Hartranft | B60S 1/528 134/18 |
| 2015/0070493 A1 * | 3/2015 | Chan | H04N 5/2256 348/143 |
| 2018/0017785 A1 | 1/2018 | Bulgajewski et al. | |
| 2020/0039439 A1 * | 2/2020 | Wang | G03B 17/08 |
| 2020/0096838 A1 * | 3/2020 | Kirchhoff | B60R 1/12 |

FOREIGN PATENT DOCUMENTS

| | | |
|---|---|---|
| DE | 103 26 896 A1 | 5/2003 |
| DE | 10 2016 105 569 A1 | 1/2017 |

OTHER PUBLICATIONS

Search report for DE 10 2018 216 459.2, dated Feb. 19, 2019, 12 pp.

* cited by examiner

*Primary Examiner* — William B Perkey

(74) *Attorney, Agent, or Firm* — Crowell & Moring LLP

(57) ABSTRACT

The invention relates to a camera module (100) for a vehicle. The camera module (100) has a housing section (105) with a camera lens (110) and is characterized in that the camera module (100) contains a cylindrical front cover receiver (115) surrounding the housing section (105) that extends beyond the camera lens (110). A transparent front cover (120) for the camera lens (110) is received in the front cover receiver (115). The front cover (120) has an outer surface (125) that can be exposed to environmental effects.

28 Claims, 4 Drawing Sheets

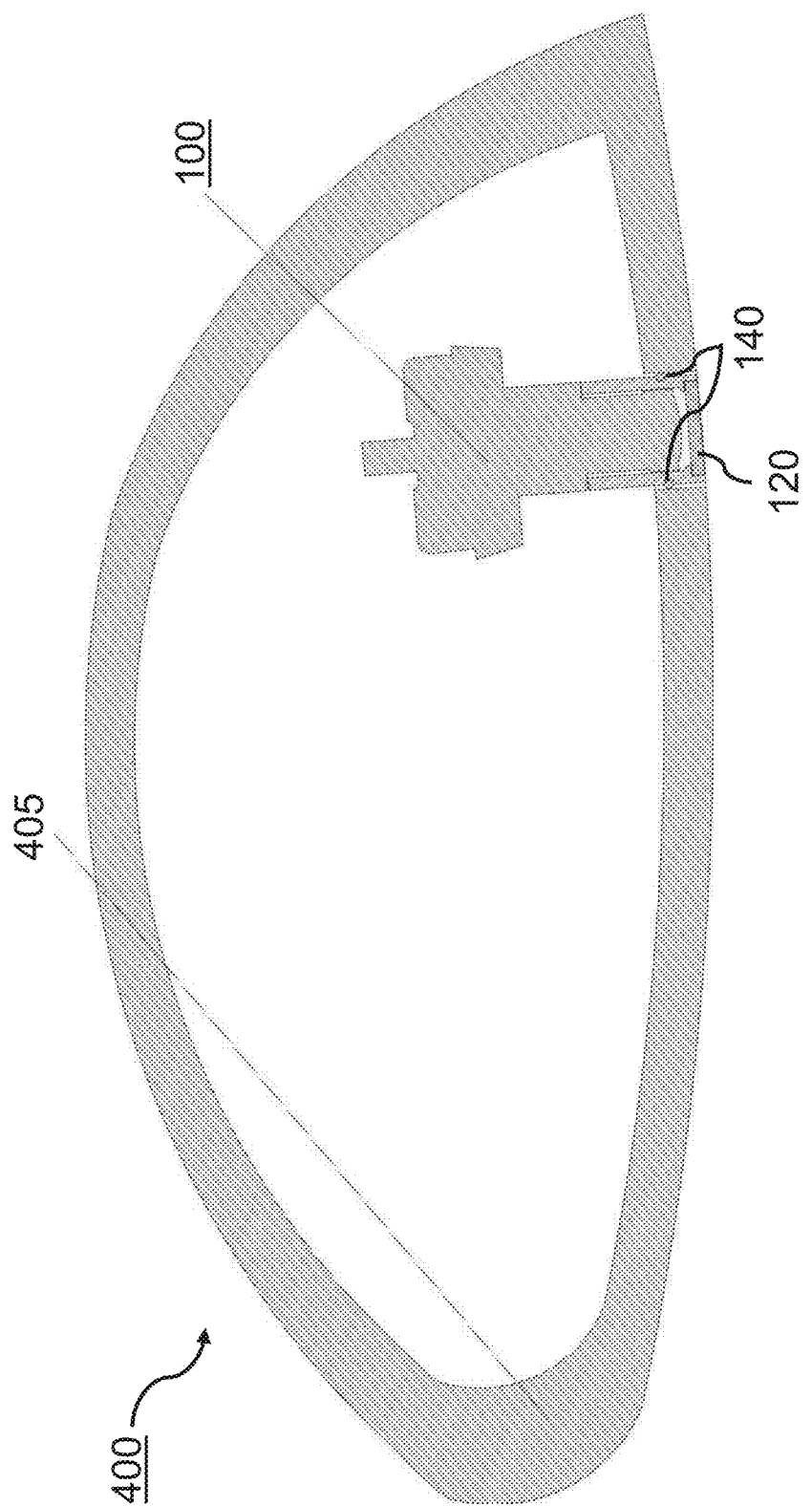

CAMERA MODULE FOR A VEHICLE AND OUTSIDE BODY PART WITH CAMERA MODULE

CROSS-REFERENCE TO RELATED APPLICATIONS

This application claims priority from German Patent Application DE 10 2018 216 459.2, filed Sep. 26, 2018, the entirety of which is hereby fully incorporated by reference herein.

Camera Module for a Vehicle and Outside Body Part with Camera Module

The present invention relates to a camera module for a vehicle and an outside body part, in particular an outer mirror, for a vehicle that contains the camera module.

A vehicle can have one or more cameras to assist in driving the vehicle, which can be used, for example, in maneuvering the vehicle. The one or more cameras can be placed on an outer surface of the vehicle for detecting a vehicle environment, e.g. on the outer mirrors of the vehicle. A cleaning system can be integrated for cleaning a camera lens, which can carry out a cleaning at regular intervals.

Based on this, the present invention creates an improved camera module for a vehicle and an improved outside body part that has a camera module, according to the independent claims. Advantageous embodiments can be derived from the dependent claims and the following description.

The approach presented herein is based on the knowledge that a cleaning of a camera lens with a special cleaning system can be eliminated with a camera front that protects the camera lens. The camera front of the camera module presented herein can be exposed to environmental effects and can advantageously be cleaned aerodynamically due to its shape. The camera lens can thus be prevented from becoming dirty and limiting the viewing range of the camera. The approach presented herein can also advantageously be implemented inexpensively and the camera module can be placed on a vehicle in a space-saving manner.

A camera module for a vehicle contains a housing section that has a camera lens. The camera module also contains a cylindrical front cover receiver surrounding the housing section, that extends beyond the camera lens. A transparent front cover for the lens is received in the front cover receiver. The front cover has an outer surface that can be exposed to environmental effects.

The vehicle can be a motor vehicle, e.g. an automobile, a bus, a utility vehicle, or a transport vehicle for transporting goods or people. The vehicle can be an autonomous vehicle. The camera module can be part of an environment detection system of the vehicle or part of another assistance system of the vehicle. The front cover receiver can be connected to the first housing section or another housing section of the camera module. The front cover receiver can also be in the form of a sleeve for the first housing section. For this, the front cover receiver can be in the form of a hollow cylinder. The front cover receiver can also contain a bearing surface for the front cover in the section extending beyond the camera lens, which has, e.g., a first surface section running along a longitudinal extension axis of the front cover receiver, and a second surface section at a right angle to the first surface section, which enables a robust attachment to the front cover. The extension beyond the camera lens can be at least as long as the maximum thickness of the front cover, or it can extend beyond this thickness. The front cover can be made of glass, or a transparent plastic, for example.

According to one embodiment, the front cover and the front cover receiver can be designed to seal the camera lens against environmental effects. For this, the front cover can be connected to the front cover receiver in a material bonded, force fitting, or form fitting manner. In order to seal the camera lens against environmental effects, the front cover and the front cover receiver can seal the housing section that contains the camera lens such that it is fluid-tight. As a result, the camera lens is protected against dirt and potential damage from environmental effects.

The outer surface of the front cover can close off the extension of the front cover receiver according to one embodiment. The extension of the front cover receiver can be used in this manner as a receiving surface for the front cover, in order to attach the front cover securely to the front cover receiver. For this, the front cover can be glued, for example, into the extension of the front cover receiver. The closing off of the extension of the front cover receiver by the outer surface of the front cover can also be advantageous for an integration of the camera module in an outside body part of the vehicle, e.g. a side mirror. In addition, the closing off is advantageous in terms of preventing an accumulation of dirt in the transition between the front cover and the front cover receiver.

Furthermore, the outer surface of the front cover can exhibit a planar surface according to one embodiment. In addition, the extension of the front cover receiver can also form a planar surface with the outer surface of the front cover, thus with the side facing away from the camera lens. This is advantageous for an aerodynamic cleaning of the outer surface of the front cover.

The front cover according to one embodiment can also have a water repellent coating. The water repellent coating can also only be applied to the outer surface of the front cover, for example. The water repellent can be a superhydrophobic coating, for example, causing raindrops to roll off the front cover. The water repellent coating can advantageously prevent a reduction in the image quality of the camera caused by water on the front cover. Additionally or alternatively, the front cover can also have an antireflection coating. The antireflection coating can be applied to the outer surface and the inner surface of the front cover. Undesired light reflections from the camera lens can be advantageously minimized by the antireflection coating.

The front cover can exhibit a uniform thickness according to one embodiment. The outer surface and the inner surface can thus be spaced apart from one another to the same extent at every point. By way of example, the outer surface and inner surface are each planar for this. The uniform thickness is advantageous in that it does not have a negative effect on how the light enters the camera lens.

Furthermore, an inner surface of the front cover can exhibit a curvature according to one embodiment. By way of example, the inner surface can be convex or concave. This has an advantageous effect on the viewing range of the camera, e.g. enlarging the viewing range. The inner surface of the front cover can also be used as a lens in this manner. Advantageously, it is therefore possible to inexpensively modify the viewing range of the camera.

The camera lens can be attached to the housing section by a collar bushing according to one embodiment. This advantageously secures the camera lens to the housing section in a space-saving and robust manner.

An outside body part, in particular an outer mirror, of a vehicle is also presented with this approach. The outside body part has a housing. An embodiment of the above camera module is received in the housing. The housing for the outside body part is designed to be closed off with the front cover of the camera module.

The outside body part can be a component of the body of a vehicle that is exposed to environmental effects on an outer surface of the vehicle, e.g. a radiator grill or rear end. The outside body part can be an outer mirror in particular. The outside body part can be shaped to correspond to the aerodynamics of the vehicle body. The housing can contain a recess for receiving the camera module. The housing can be designed to enclose the camera module on three sides. The housing can form a planar surface with the front cover of the camera module, for example.

According to one embodiment, a flexible seal can be placed between the housing and the camera module, so that the camera module is connected to the housing such that it can be removed therefrom. The flexible seal can be an annular sealing element, e.g. an O-ring. It is advantageous if the camera module can be removed from the housing, thus allowing for the camera module to be replaced of without having to remove the outside body part.

The invention shall be explained in greater detail by way of example based on the attached drawings. Therein:

FIG. 4 shows a schematic illustration of an outer mirror for a vehicle with a camera module according to an exemplary embodiment.

In the following description of preferred exemplary embodiments of the present invention, the same or similar reference symbols shall be used for the elements shown in the various figures that have similar functions, wherein there shall be no repetition of the description of these elements.

Figure 1:
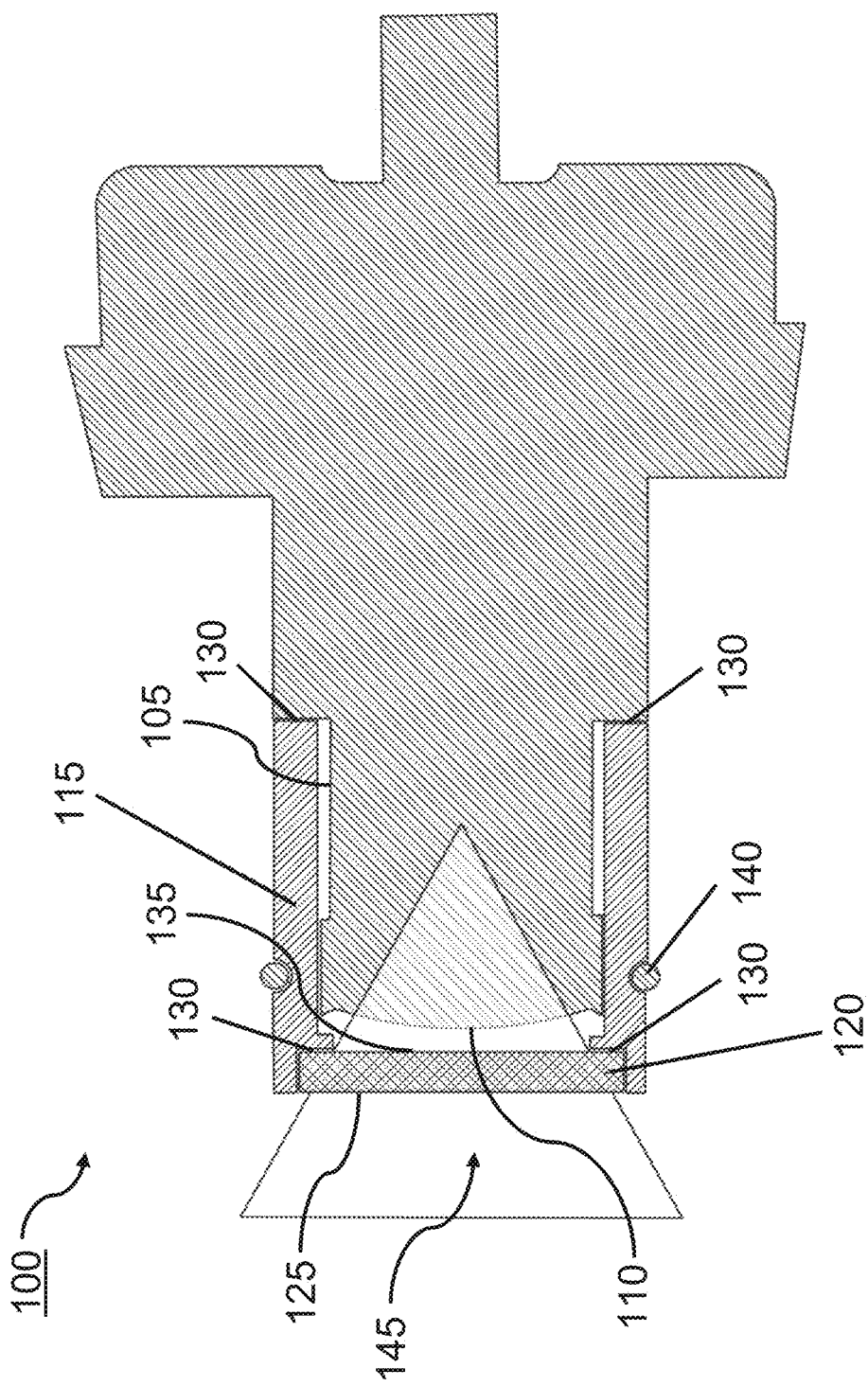
FIG. 1 shows a schematic illustration of a camera module for a vehicle according to an exemplary embodiment.

FIG. 1 shows a schematic illustration of a camera module 100 for a vehicle according to an exemplary embodiment. The camera module 100 comprises a housing section 105 with a camera lens 110. The camera lens is located at an exposed end of the housing section 105. In addition, the camera module 100 has a cylindrical front cover receiver 115 surrounding the housing section 105. A transparent front cover 120 for the camera lens 110 is received in the front cover receiver 115. The front cover 120 has an outer surface that can be exposed to environmental effects.

According to one exemplary embodiment, the front cover 120 is located at a distance to the camera lens 110, forming a gap therebetween. An axis of symmetry for the front cover 120 coincides with an axis of symmetry for the camera lens 110 according to one exemplary embodiment.

The camera module 100 shown herein can be used for monitoring in the vehicle, in order to assist in the driving of the vehicle. One exemplary embodiment of the camera module 100 shown herein enables an adaptive integration of the camera in the vehicle. The front cover 120 is connected here to the front cover receiver 115 with a material bonded connection 130, by way of example. In addition, the front cover receiver 115 is connected to a housing for the camera module 100 by means of a material bonded connection 130. By way of example, the housing contains an offset in the region of the material bonded connection 130, from which the housing section 105 extends. Alternatively, a force or form fitting connection can be implemented between the front cover 120 and the front cover receiver 115, and between the front cover receiver 115 and the camera module 100. The front cover 120 can be made of glass or a transparent plastic. The front cover receiver 115 is designed to secure the front cover 120 in place.

According to the exemplary embodiment shown herein, the front cover 120 and the front cover receiver 115 are designed to seal the camera lens against environmental effects. For this, the front cover 120 is glued into the front cover receiver 115. The gluing is designed to seal, and thus protect the camera lens 110, the housing section 105, and the camera module 100 against environmental effects, with the exception of the outer surface 125 of the front cover 120, which can be exposed to the environmental effects.

The outer surface 125 of the front cover 120 closes off the extension of the front cover receiver 115 according to the exemplary embodiment shown herein. The front cover 120 and the front cover receiver 115 thus form a planar surface on the side facing away from the camera lens 110, by way of example. This advantageously allows for an integration of the camera module 100 in an outside body part such as a side mirror. The closing off of the extension of the front cover receiver 115 is also advantageous insofar as this prevents an accumulation of dirt between the front cover 120 and the front cover receiver 115. This is also advantageous with regard to an aerodynamic self-cleaning of the front cover 120, and thus the camera module 100.

Figure 3:
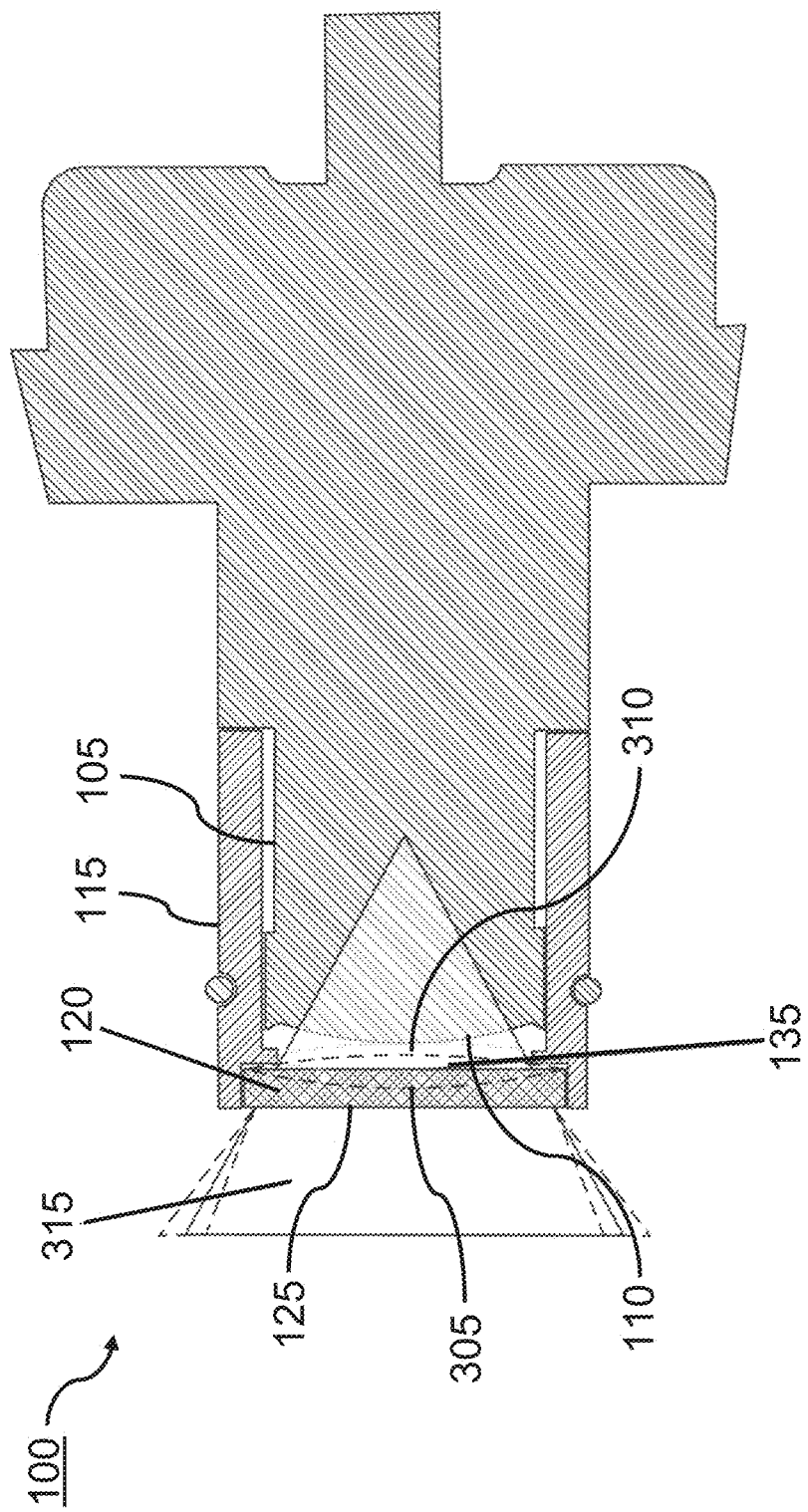
FIG. 3 shows a schematic illustration of a camera module for a vehicle according to an exemplary embodiment.

In addition, the outer surface 125 of the front cover 120 according to the exemplary embodiment shown herein has a planar surface. By way of example, the inner surface 135 of the front cover 120 also exhibits a planar surface here. As a result, the viewing range of the camera lens 110 is not altered by the shape of the front cover 120. Alternatively, the front cover 120 can have a convex outer surface 125 and/or inner surface 135, as is shown in FIG. 3.

The front cover 120 has a uniform thickness according to the exemplary embodiment shown herein. This is advantageous in that it does not have a negative effect on the light entering the camera lens 110 due to a change in thickness in the front cover 120.

The front cover receiver 115 exhibits an O-ring 140 by way of example. The O-ring allows the camera module 100 to be sealed in a flexible manner against an outside body part, thus enabling a simple removal of the entire camera module 100. In addition, an exemplary field of view 145 of the camera module 100, also referred to as "field of view" (FOV) is illustrated. The field of view 145 indicates a region within the perspective of the camera lens 110. An outer surface of the front cover receiver 115 contains a circumferential groove for retaining the O-ring 140. By way of example, the groove is located at the level of the camera lens 110.

Figure 2:
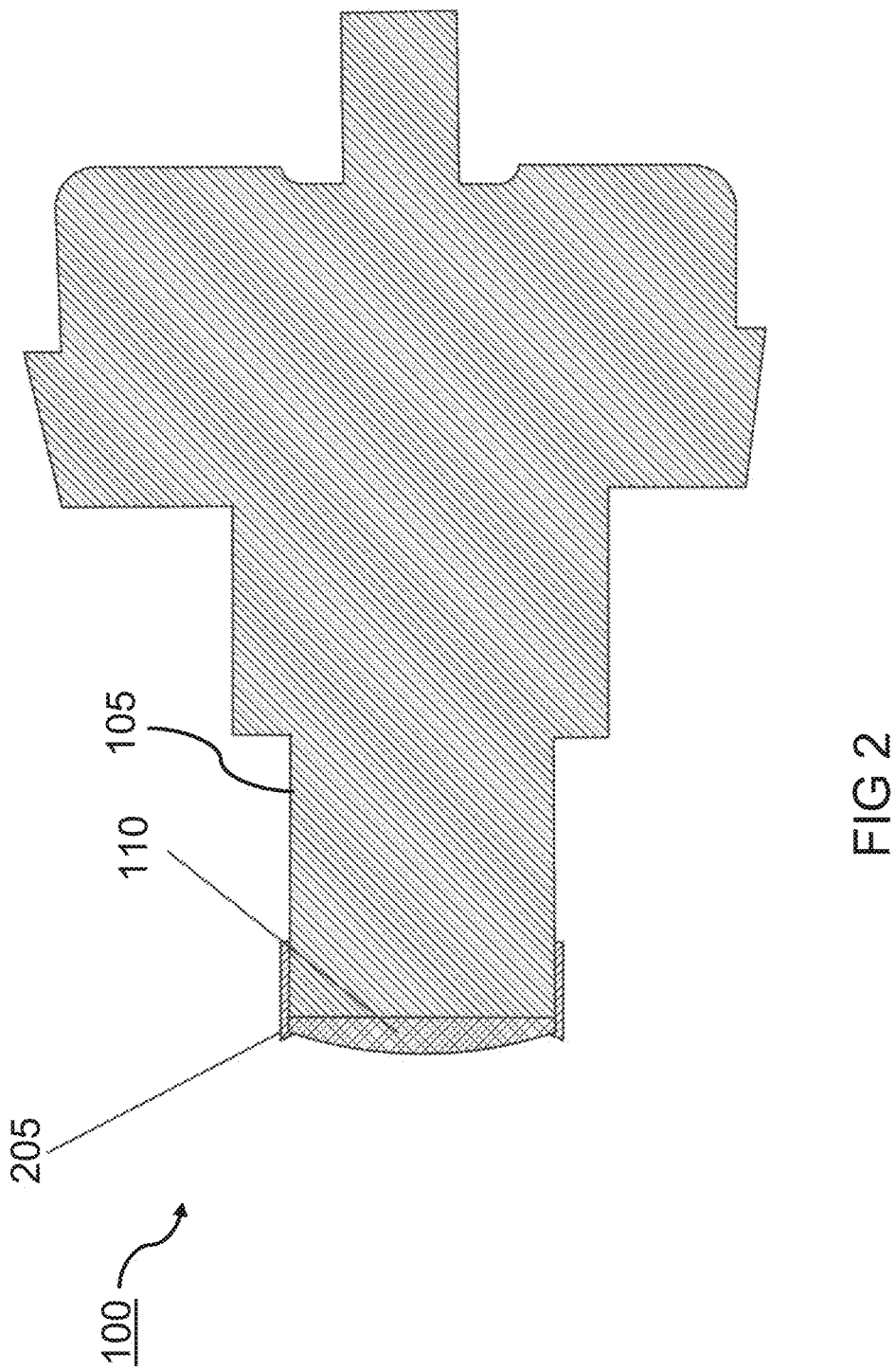
FIG. 2 shows a schematic illustration of a part of a camera module for a vehicle according to an exemplary embodiment.

FIG. 2 shows a schematic illustration of a part of a camera module 100 for a vehicle according to an exemplary embodiment. The part of the camera module 100 that is shown contains the housing section 105 with the camera lens 110. The components of the camera module 100 shown herein are similar or correspond to the components of the camera module described in reference to FIG. 1.

According to the exemplary embodiment shown herein, the camera lens 110 is secured in place on the housing section 105 by means of a collar bushing 205. The camera lens 110 is shown as a convex shaped lens herein, by way of example. There is an offset formed between the collar bushing 205 and the camera lens 110. This offset is located in the field of view of the camera lens 110. If the camera 110 is not protected by the front cover received in the front cover receiver, dirt can accumulate in the region of the offset between the collar bushing 205 and the camera lens 110.

This is advantageously prevented by means of the front cover receiver and the front cover shown in FIG. 1. A planar sealed surface of the camera module is advantageous for the aerodynamic self-cleaning.

FIG. 3 shows a schematic illustration of a camera module 100 for a vehicle according to an exemplary embodiment. The camera module 100 shown herein is similar or corresponds to the camera module described in reference to FIG. 1, which contains the housing section 105, the camera lens 110, the front cover receiver 115, and the front cover 120.

According to one exemplary embodiment, the front cover 120 has a water-repellent coating. Additionally or alternatively, the front cover 120 has an antireflection coating. The water-repellent coating can also be applied to the outer surface 125 of the front cover 120 in order to repel undesired raindrops striking the surface of the front cover 120, so that the imaging of the camera module 100 is not negatively affected. The antireflection coating, also referred to as "antireflection coating," is applied to the outer surface 125 and the inner surface 135 of the front cover 120 according to one exemplary embodiment. As a result, undesired light reflections in front of the camera lens 110 are minimized.

The inner surface 135 of the front cover 120 also has a convex shape according to one exemplary embodiment, as is indicated here by the broken line 305, or the inner surface 135 has a concave shape, as indicated here by way of example by the broken line 310. Cameras are vehicle components that are expensive to modify. For this reason, minimal changes in a necessary field of view can be implemented with a convex shape 305 or concave shape 310 of the inner surface 15 of the transparent front cover 120, as is illustrated here by way of example. The field of view is then modified in comparison with a front cover 120 that has a planar outer surface 125 and a planar inner surface 135, as is indicated here by the broken lines illustrating the modified field of view 315, for example.

FIG. 4 shows a schematic illustration of an outer mirror 400 for a vehicle that has a camera module 100 according to an exemplary embodiment. The camera module 100 shown herein is similar or corresponds to the camera module described in reference to the preceding figures. A cross section of the outer mirror 400 is shown. The outside body part, in this case the outer mirror 400, has a housing 405 in which an exemplary embodiment of the camera module 100 is received. The housing 405 is designed to be closed off by the front cover 120 of the camera module 100. A planar surface of the front cover 120 is advantageous for this connection in enabling the camera module 100 to be integrated in the individual shape of the housing 405, thus resulting in an aerodynamic self-cleaning of the front cover 120. A positioning of the camera module 100 in the housing 405 is shown by way of example here.

The camera module shown herein can not only be integrated in the outer mirror 400, but also on other outside body parts, e.g. a radiator grill or a rear end of a vehicle. This is advantageous because cameras on a vehicle can assist a driver in different driving situations. Particularly when maneuvering the vehicle, the view of the driver may be limited, such that the assistance of a camera is useful. In the implementation of autonomous driving, cameras and the camera module 100 shown here are also advantageous. The cameras are subjected to high standards for autonomous driving, in particular for detecting the environment. For this reason, the camera lenses must be kept clean. In this context, an integration of the camera module 100 with the front cover 120 shown herein is also advantageous because this enables an aerodynamic cleaning of the front cover 120, and it is possible to keep the camera lens of the camera module 100 clean. A special shape of the profile of the outer mirror 400 is necessary for the cleaning of the front cover 120, as is shown here by way of example, which has an advantageous effect on an airflow at the front cover for the aerodynamic cleaning.

According to the exemplary embodiment shown herein, a flexible seal 140 is placed between the housing 405 and the camera module 100, connecting the camera module 100 to the housing 405 such that it can be removed therefrom. The flexible seal 140 is in the form of an O-ring 140 here. This is advantageous for enabling a simple and quick installment and removal of the camera module 100.

If an exemplary embodiment comprises an "and/or" conjunction between a first feature and a second feature, this can be read to mean that the exemplary embodiment according to a first embodiment contains both the first feature and the second feature, and according to a second embodiment, contains either just the first feature or just the second feature.

REFERENCE SYMBOLS 100 camera module
105 housing section
110 camera lens
115 front cover receiver
120 front cover
125 outer surface of the front cover
130 material bonded connection
135 inner surface of the front cover
140 O-ring
145 field of view
205 collar bushing
305 convex shape of the inner surface of the front cover
310 concave shape of the inner surface of the front cover
315 modified field of view
400 outer mirror
405 housing for the outer mirror

The invention claimed is:

1. A camera module for a vehicle, the camera module comprising:
    a housing section with a camera lens;
    a cylindrical front cover receiver housing that encompasses the housing section of the camera module, wherein the cylindrical front cover receiver housing extends beyond the camera lens; and
    a transparent front cover attached to the front cover receiver housing such that at least a portion of the cylindrical front cover receiver housing surrounds peripheral edges of the transparent front cover, wherein the transparent front cover has an outer surface that can be exposed to environmental effects, and wherein the outer surface of the transparent front cover and the portion of the cylindrical front cover receiver housing surrounding the transparent front cover together form a planar surface, and wherein the transparent front cover further comprises an inner surface that is curved.

2. The camera module according to claim 1, wherein the transparent front cover and the front cover receiver housing are designed to seal the camera lens against environmental effects.

3. The camera module according to claim 1, wherein the outer surface of the transparent front cover closes off the extension of the front cover receiver housing.

4. The camera module according to claim 1, wherein the transparent front cover has a water-repellent coating.

5. The camera module according to claim 1, wherein the camera lens is secured in place on the housing section by a collar bushing.

6. The camera module according to claim 1, further comprising a flexible seal configured to be placed between a vehicle housing and the camera module, and wherein the camera module is configured to be connected to the vehicle housing such that the camera module can be removed therefrom.

7. The camera module according to claim 1, wherein the transparent front cover has an antireflection coating.

8. A camera module for a vehicle, the camera module comprising:
- a housing section with a camera lens;
- a cylindrical front cover receiver housing that encompasses the housing section of the camera module, wherein the cylindrical front cover receiver housing extends beyond the camera lens; and
- a transparent front cover attached to the front cover receiver housing such that at least a portion of the cylindrical front cover receiver housing surrounds peripheral edges of the transparent front cover, wherein the transparent front cover has an outer surface that can be exposed to environmental effects, and wherein the outer surface of the transparent front cover and the portion of the cylindrical front cover receiver housing surrounding the transparent front cover together form a planar surface,
- wherein the camera lens is secured in place on the housing section by a collar bushing.

9. The camera module according to claim 8, wherein the transparent front cover has a uniform thickness.

10. The camera module of claim 8, wherein the transparent front cover and the front cover receiver housing are designed to seal the camera lens against environmental effects.

11. The camera module of claim 8, wherein the outer surface of the transparent front cover closes off the extension of the front cover receiver housing.

12. The camera module of claim 8, wherein the transparent front cover has at least one of a water-repellent coating or an antireflection coating.

13. The camera module of claim 8, further comprising a flexible seal configured to be placed between the housing of the outside body part and the camera module, and wherein the camera module is configured to be connected to the vehicle housing such that the camera module can be removed therefrom.

14. A camera module for a vehicle, the camera module comprising:
- a housing section with a camera lens;
- a cylindrical front cover receiver housing that encompasses the housing section of the camera module, wherein the cylindrical front cover receiver housing extends beyond the camera lens;
- a transparent front cover attached to the front cover receiver housing such that at least a portion of the cylindrical front cover receiver housing surrounds peripheral edges of the transparent front cover, wherein the transparent front cover has an outer surface that can be exposed to environmental effects, and wherein the outer surface of the transparent front cover and the portion of the cylindrical front cover receiver housing surrounding the transparent front cover together form a planar surface; and
- a flexible seal configured to be placed between a vehicle housing and the camera module, and wherein the camera module is configured to be connected to the vehicle housing such that the camera module can be removed therefrom.

15. The camera module of claim 14, wherein the transparent front cover and the front cover receiver housing are designed to seal the camera lens against environmental effects.

16. The camera module of claim 14, wherein the outer surface of the transparent front cover closes off the extension of the front cover receiver housing.

17. The camera module of claim 14, wherein the transparent front cover has at least one of a water-repellent coating or an antireflection coating.

18. The camera module of claim 14, wherein the transparent front cover has a uniform thickness.

19. The camera module of claim 14, further comprising an inner surface of the transparent front cover that is curved.

20. An outside body part for a vehicle comprising a housing, wherein a camera module is received in the housing, and wherein the housing is designed to be closed off by the front cover, wherein the camera module comprises:
- a housing section with a camera lens;
- a cylindrical front cover receiver housing that encompasses the housing section of the camera module, wherein the cylindrical front cover receiver housing extends beyond the camera lens;
- a transparent front cover attached to the front cover receiver housing such that at least a portion of the cylindrical front cover receiver housing surrounds peripheral edges of the transparent front cover, wherein the transparent front cover has an outer surface that can be exposed to environmental effects, and wherein the outer surface of the transparent front cover and the portion of the cylindrical front cover receiver housing surrounding the transparent front cover together form a planar surface.

21. The outside body part of claim 20, wherein the outside body part further comprises an outer mirror for the vehicle.

22. The outside body part of claim 20, wherein the transparent front cover and the front cover receiver housing are designed to seal the camera lens against environmental effects.

23. The outside body part of claim 20, wherein the outer surface of the transparent front cover closes off the extension of the front cover receiver housing.

24. The outside body part of claim 20, wherein the transparent front cover has at least one of a water-repellent coating or an antireflection coating.

25. The outside body part of claim 20, wherein the transparent front cover has a uniform thickness.

26. The outside body part of claim 20, further comprising an inner surface of the transparent front cover that is curved.

27. The outside body part of claim 20, wherein the camera lens is secured in place on the housing section by a collar bushing.

28. The outside body part of claim 20, further comprising a flexible seal configured to be placed between the housing of the outside body part and the camera module, and wherein the camera module is configured to be connected to the vehicle housing such that the camera module can be removed therefrom.

* * * * *